United States Patent [19]
Barz et al.

[11] Patent Number: 5,902,625
[45] Date of Patent: May 11, 1999

[54] PROCESS OF MAKING A SOFT OR SEMI-SOFT FIBROUS CHEESE

[75] Inventors: Richard Lee Barz, Littleton; Carolyn Parks Cremer, Englewood, both of Colo.; Ann V. Durkin, Redwood City, Calif.

[73] Assignee: Leprino Foods Company, Denver, Colo.

[21] Appl. No.: 08/733,474

[22] Filed: Oct. 18, 1996

Related U.S. Application Data

[63] Continuation-in-part of application No. 08/389,932, Feb. 16, 1995, Pat. No. 5,567,464, and a continuation-in-part of application No. 08/583,624, Jan. 5, 1996, abandoned, which is a division of application No. 08/319,009, Oct. 6, 1994, Pat. No. 5,484,618, which is a division of application No. 08/130,420, Oct. 1, 1993, Pat. No. 5,380,543, which is a continuation of application No. 07/835,347, Feb. 14, 1992, abandoned.

[30] Foreign Application Priority Data

Feb. 16, 1996 [WO] WIPO ............... PCT/US96/02328

[51] Int. Cl.⁶ .................................................. A23C 19/14
[52] U.S. Cl. .................... 426/582; 426/578; 426/583; 426/650; 426/654; 426/656
[58] Field of Search .................... 426/582, 578, 426/583, 650, 654, 656

[56] References Cited

U.S. PATENT DOCUMENTS

| | | |
|---|---|---|
| 2,319,187 | 5/1943 | Ingle . |
| 2,733,148 | 1/1956 | Russo . |
| 3,078,170 | 2/1963 | Leber .......................................... 99/116 |
| 3,445,241 | 5/1969 | Pontecorvo et al. ....................... 99/116 |
| 3,615,586 | 10/1971 | Rohlfs et al. . |
| 3,961,077 | 6/1976 | Kielsmeier . |
| 4,012,534 | 3/1977 | Kichline et al. . |

(List continued on next page.)

FOREIGN PATENT DOCUMENTS

| | | |
|---|---|---|
| 141283 | 5/1971 | Czechoslovakia . |
| 0063728 | 11/1982 | European Pat. Off. . |
| 0515318 | 11/1992 | European Pat. Off. . |
| 0535728 | 4/1993 | European Pat. Off. . |
| 2247981 | 5/1975 | France . |
| 1-148147 | 6/1989 | Japan . |
| 4-218334 | 8/1992 | Japan . |
| 2000010 | 1/1979 | United Kingdom . |

OTHER PUBLICATIONS

"Ripening Changes in Cephalotyre 'Ras' Cheese Slurries", Attia A. Abdel Baky, et al., Journal of Dairy Research (1982).
"Process Cheese Principles", Lawrence A. Shimp, Food Technology (1995).
"Effect of Adding Sodium Citrate to Buffaloes' Milk on Chemical and Organoleptic Properties of Ras Cheese", A.E. Shehata, et al., Dairy Science Abstracts vol. 41, No. 9 (1979).
21 CFR §§ 133.169, 133.173, 133.175, 133.178, and 133.179.

Primary Examiner—Helen Pratt
Attorney, Agent, or Firm—Fitzpatrick, Cella, Harper & Scinto

[57] ABSTRACT

A process of manufacturing a soft or semi-soft fibrous cheese comprising the steps of a) pasteurizing milk; b) acidifying the milk; c) coagulating the milk to obtain curd and whey; d) cutting the coagulum and draining the whey, thereby leaving a cheese curd; e) heating, kneading, and stretching the curd (e.g., in mixer/cooker 1) until it is a homogeneous, fibrous mass of cheese; f) forming the cheese into a shape (e.g., by pumping it through extruder 8); g) cooling the shaped cheese in cold brine (e.g., in brine tanks 11 and 15); and h) removing the cooled cheese from the brine (e.g., by conveyor 16). A food additive is thoroughly mixed into the heated cheese (for example in additional mixer 6) after the cheese has been heated, kneaded, and stretched, but before it has been formed into a shape. The additive can be a gum, stabilizer, colorant, dairy solid, cheese powder, flavor, non-dairy protein isolate, salt, or food starch.

50 Claims, 7 Drawing Sheets

U.S. PATENT DOCUMENTS

| | | |
|---|---|---|
| 4,066,800 | 1/1978 | Rosenau .................................. 426/582 |
| 4,075,360 | 2/1978 | Rule et al. . |
| 4,143,175 | 3/1979 | Whelan et al. . |
| 4,169,160 | 9/1979 | Wingerd et al. ........................ 426/582 |
| 4,188,411 | 2/1980 | Kuipers et al. ......................... 426/582 |
| 4,197,322 | 4/1980 | Middleton . |
| 4,226,888 | 10/1980 | Siecker . |
| 4,448,116 | 5/1984 | Muzzarelli ............................... 99/460 |
| 4,682,538 | 7/1987 | Zahlaus ................................... 99/453 |
| 4,919,943 | 4/1990 | Yee et al. . |
| 4,940,600 | 7/1990 | Yokoyama et al. . |
| 5,030,470 | 7/1991 | Kielsmeier et al. . |
| 5,080,913 | 1/1992 | Gamay . |
| 5,104,675 | 4/1992 | Callahan et al. . |
| 5,200,216 | 4/1993 | Barz et al. . |
| 5,225,220 | 7/1993 | Gamay . |
| 5,234,700 | 8/1993 | Barz et al. . |
| 5,350,595 | 9/1994 | Hockenberry . |
| 5,380,543 | 1/1995 | Barz et al. . |
| 5,395,630 | 3/1995 | Gamay . |
| 5,431,946 | 7/1995 | Vesely et al. ........................... 426/582 |
| 5,466,477 | 11/1995 | Sevenich . |
| 5,470,595 | 11/1995 | Kopp et al. . |
| 5,567,464 | 10/1996 | Barz et al. .............................. 426/582 |

EXAMPLE III

EXAMPLE III

EXAMPLE III

EXAMPLE III

EXAMPLE III

EXAMPLE III

PROCESS OF MAKING A SOFT OR SEMI-SOFT FIBROUS CHEESE

BACKGROUND OF THE INVENTION

The present application is a continuation-in-part of U.S. patent application Ser. No. 08/389,932 filed Feb. 16, 1995 now U.S. Pat. No. 5,567,464, and a continuation-in-part of U.S. patent application Ser. No. 08/583,624 filed Jan. 5, 1996 now abandoned, which is a division of application Ser. No. 08/319,009 filed Oct. 6, 1994 (now U.S. Pat. No. 5,484,618), which is a division of application Ser. No. 08/130,420 filed Oct. 1, 1993 (now U.S. Pat. No. 5,380,543), which is a continuation of application Ser. No. 07/835,347 filed Feb. 14, 1992, now abandoned.

FIELD OF THE INVENTION

This invention relates to the preparation of a soft or semi-soft fibrous cheese, for example a mozzarella variety of cheese. In particular, it relates to a process of making such a cheese for baking purposes, for instance to be used as the exposed cheese on a pizza or as the string cheese rolled in the outer lip of a pizza crust (a so-called "stuffed crust pizza").

DESCRIPTION OF RELATED ART

Soft or semi-soft fibrous cheeses are normally prepared by a process involving the following sequential steps:

a) pasteurizing cow's or buffalo milk;
b) acidifying the milk to convert it to a cheese milk;
c) coagulating the cheese milk to obtain a coagulum comprised of curd and whey;
d) cutting the coagulum and draining the whey therefrom, thereby leaving a cheese curd;
e) heating, kneading, and stretching the cheese curd until it is a homogeneous, fibrous mass of heated, unripened cheese;
f) forming the heated cheese into a shape;
g) cooling the shaped cheese in cold brine; and
h) removing the cooled cheese from the brine.

Cheeses made by this process are known under a variety of names, including mozzarella, pasta filata, provolone, scamorze, and pizza cheese. (For ease of reference, all such cheeses are referred to herein as "mozzarella variety cheeses.") The process itself is sometimes called "the pasta filata process." (See the Nov. 8, 1995 Draft New International Individual Standard for Mozzarella for the Codex Alimentarius, incorporated herein by reference.) Some of these cheeses are referred to by some in the industry as "soft," but by others as "semi-soft." If the cheese contains not less than 20 wt. % milkfat, and not more than 60 wt. % water, it is considered a "full fat soft cheese" under the Cheese Regulations 1970 (No. 94) of the United Kingdom (Part II(5)(2)(a)).

It is known that the properties of such a cheese can be modified by spraying an aqueous solution of a flavoring additive and/or one or more other cheese chemicals, such as an emulsifying agent, on the finished cheese. Thus, for example, Barz et al. (U.S. Pat. No. 5,200,216) discloses that mozzarella cheese may be comminuted, frozen, and then coated with an aqueous solution of an emulsifying agent such as sodium citrate.

In the manufacture of process cheese, emulsifying salts such as a sodium phosphate or sodium citrate are commonly used. Process cheese is prepared by heating comminuted, natural hard cheese and/or soft cheese in a mixture with 2 to 3% of an emulsifying salt in a melting process to a temperature in the range of about 80 to 950° C. (176 to 203° F.). During this melting process, the insoluble starting cheeses are converted into liquid by means of the emulsifying salt. After about 4 to 15 minutes, the molten mass is cooled and solidified. (See, for example, U.S. Pat. Nos. 3,615,586, 5,466,477, and 5,470,955.)

U.S. Pat. No. 5,080,913 (Gamay) discloses a process for preparing a low fat cheese in which a stabilizer such as carrageenan is added to the milk before or after pasteurization, optionally in combination with dry skim milk, dried whey, flavorants, and/or other gums and casein stabilizers.

U.S. Pat. No. 5,395,630 (Gamay) discloses a method of making a low fat, pasteurized, process cheese in which the starting skim milk cheese is mixed with various food additives and the mixture is cooked at a temperature of about 160° F. (71° C.). Among the additives disclosed are emulsifiers, stabilizers, flavorants, gums, sorbic acid, whey solids, and annatto color.

European Patent Publication No. 0 515 318 A1 (Vesely et al.) discloses a pasta filata type cheese specialty in which other ingredients such as fruit, vegetables, meat, spices, starches and the like are mixed into the cut chunks of curd prior to "roping." Examples of added ingredients are mixtures containing tomato, salmon, strawberries, frankfurters, tomato puree, sauerkraut, or ground black olives. The finished product has a smooth, thin skin, enabling the contained ingredients, which are not thoroughly mixed into the cheese, to be seen. Therefore, such ingredients have been added for visual appearance as well as taste, but there is no suggestion to use these ingredients, or other ingredients, to alter or enhance the melt characteristics of the cheese produced.

SUMMARY OF THE INVENTION

The process of the present invention employs the same well-known steps of preparing a soft or semi-soft fibrous cheese, namely:

a) pasteurizing cow's or buffalo milk;
b) acidifying the milk to convert it to a cheese milk;
c) coagulating the cheese milk to obtain a coagulum comprised of curd and whey;
d) cutting the coagulum and draining the whey therefrom, thereby leaving a cheese curd;
e) heating, kneading, and stretching the cheese curd until it is a homogeneous, fibrous mass of heated, unripened cheese;
f) forming the heated cheese into a shape;
g) cooling the shaped cheese in cold brine; and
h) removing the cooled cheese from the brine. However, in the process of the present invention, between steps (e) and (f), there is thoroughly mixed into the heated cheese a minor amount of at least one GRAS food additive selected from the group consisting of emulsifying agents, gums, stabilizers, colorants, dairy solids, cheese powders, flavors, non-dairy protein isolates, salt (sodium chloride) and native or modified food starches. (GRAS stands for Generally Recognized As Safe for use as a food additive.)

The term "emulsifying agent" is intended to include (but not be limited to) the chemical compounds known as sequestrants. If an emulsifying agent is, used, preferably it is a cheese emulsifier that sequesters calcium ions in the cheese—i.e., reduces the degree to which the calcium is ionically bound to the protein in the cheese. Calcium-binding emulsifying salts are preferred, particularly those selected from the group consisting of phosphates and citrates. Sodium and sodium aluminum salts are most preferred. Examples of suitable phosphates are sodium hexametaphosphate (SHMP), monosodium phosphate (MSP), sodium tripolyphosphate (STPP), and disodium phosphate (DSP). DSP is generally available in its hydrated form, disodium phosphate dihydrate. The preferred citrate emulsifier is sodium citrate, which, in solid form, is generally commercially available as sodium citrate dihydrate. The ideal amount of emulsifying agent to use will vary, depending upon its chemical identity, the intended end use of the cheese, and the other combination of cheese-making conditions employed, but it can be easily ascertained on a case-by-case basis with a slight amount of experimentation. Preferably, however, the emulsifying agent will be used at a level not exceeding what is considered to be generally recognized as safe, e.g., in an amount within the range of about 0.01 to 2%, based on the weight of the finished cheese. Often, about 0.5 to 2% of the emulsifying agent will be used, or an amount within the range of about 0.8 to 2%.

The emulsifying agent can be incorporated into the heated cheese in a dry form, but the preferred method of addition is first to make an aqueous solution of the additive, typically in the range of about 5 to 50 wt. % solids, e.g., about 20 to 40%, and then add that to the heated cheese.

The incorporation of a gum and/or stabilizer in the cheese is generally useful to bind water and firm the cheese body. Examples of suitable gums include xanthan gum, guar gum, and locust bean gum. Examples of suitable stabilizers include chondrus extract (carrageenan), pectin, gelatin, and agar preferably. The total amount of gums and stabilizers added will generally be in the range of about 0.1 to 10%, about 1 to 4%, based on the weight of the finished cheese. It is preferable to add a gum or stabilizer in the dry form, rather than pre-mixed with water.

The effect of adding a colorant to the cheese is to alter its natural color. This can be useful, for example, in a case where consumer acceptance will be increased by altering the natural color of the cheese. It is surprising that the addition of a colorant at this stage of the process can have beneficial results. Prior to the present invention it was thought that a colorant had to be added to the milk vat to be completely absorbed throughout the cheese.

The amount of colorant added can generally be in the range of about 0.01 to 2%, based on the weight of the finished cheese. Examples of suitable colorants include annatto, tumeric, titanium dioxide, and betacarotene. Tumeric, for example, imparts a yellowish color to mozzarella, which naturally is white. The yellowish color often is preferred by consumers who perceive it to indicate a "richer" product upon cooking on a pizza. If used, tumeric will preferably be added in an amount of about 0.05 to 0.2%. One suitable source of tumeric is Chris Hansens Labs of Milwaukee, Wis.

Annatto is useful to give mozzarella cheese the appearance of cheddar. This allows one to produce a cheese for pizza baking that has the desired melt characteristics of mozzarella, but with a different appearance than that of traditional white mozzarella. The appearance can give the perception that a blend of mozzarella and cheddar has been used. Cheddar, however, has certain drawbacks when used as a pizza topping: it tends to overmelt, it is relatively expensive, and it has a relatively high fat content. Use of mozzarella that has been colored with annatto can give the appearance of a mozzarella/cheddar blend, without the negatives associated with cheddar. Annatto-colored mozzarella also can be used to replace cheddar cheese in such items as Mexican-style prepared foods and at salad bars. The preferred amount of annatto is approximately 0.1 to 0.3%. A suitable source of annatto is again Chris Hansen Labs.

The colorants can be used singly or in combinations of two or more. Thus, for example, a combination of annatto and tumeric may be used to impart a cheddar-like color to mozzarella cheese. The combination preferably will contain a major amount of annatto, e.g., an anatto-to-tumeric weight ratio within the range of about 1/1 to about 75/1, for instance approximately 2.5% annatto with approximately 0.05% tumeric. Preferably the colorant is added as a solution or dispersion in water.

The purpose of incorporating a dairy solid into the cheese in the process of the present invention is to firm the cheese, bind water, improve the melt appearance of the cooked cheese, and/or to increase the blistering of the cooked cheese. Examples of suitable dairy solids include, but are not limited to, whey protein concentrate, casein hydrolyzate, milkfat, lactalbumin, and nonfat dry milk. The dairy solids may generally be included in an amount within the range of about 0.1 to 10%, based on the weight of the finished cheese. Although the dairy solid can be pre-mixed with water, it is generally preferable to add it in dry form.

A cheese powder is a dried cheese in particulate form. The purpose of incorporating a cheese powder in the heated cheese at this stage of the process is to impart a different cheese flavor to the finished product. Examples of suitable cheese powders include, but are not limited to, Parmesan, cheddar, Monterey Jack, Romano, muenster, Swiss, and provolone powders. The cheese powder can generally be included in an amount within the range of about 0.25 to 10%, preferably about 0.25 to 1%, based on the weight of the finished cheese. Preferably it is added in dry form to the heated cheese.

The incorporation of a cheese powder according to the process of the present of the present invention can have significant advantages. Heretofore when another cheese has been blended with mozzarella, it often has been the whole (undried) cheese that has been used. The added cheese usually is more expensive than mozzarella. Therefore, it usually has been used in relatively low amounts, e.g., at or below about 10%, often at or below about 5%, based on the weight of the combined cheeses. The blending into the mozzarella of such a minor amount of a second cheese is difficult to do in high speed production equipment and can lead to non-uniformity of the blended product. By the addition of a powdered version of a second cheese according to the process of the present invention, a final product that is functionally indistinguishable from such blends of whole cheeses can be obtained, at a lower cost and with less difficulty in achieving uniform blending in the final product. One suitable source of such cheese powders is Armour Foods of Springfield, Ky.

The purpose of adding a flavor is to alter the flavor profile of the cheese, in order to meet consumer preferences. By adding the flavor at this stage of the process, as compared, say, to spraying a flavor solution on frozen particles of the cheese at the end of the production process, a more intense effect is achieved. Also, better quality control can be maintained than is the case if the flavor is simply sprayed on.

Suitable flavors for mixing into the heated cheese include, for example, cheddar cheese flavor and parmesan cheese flavor. Usually the flavor will be added in an amount within the range of about 0.01 to 5 percent, based on the weight of the finished cheese. Although it may be added in dry powdered form, preferably the flavor is added to the heated cheese in the form of an aqueous solution. Typically the solution will contain about 5 to 50 weight percent of the flavor, e.g., about 20 to 40 percent.

The purpose of incorporating a non-dairy protein isolate into the cheese in the process of the present invention is to alter the texture of the cheese and/or to change the size, color, or integrity of the blisters that are formed when the cheese is baked on a pizza, as well as other cook characteristics. Examples of suitable non-dairy protein isolates include soy protein (sometimes called "soy powder"), gelatin, wheat germ, corn germ, gluten, and egg solids. (Gelatin, as previously indicated, also acts as a stabilizer to bind water and firm the cheese.) The amount of non-dairy protein isolate that might be added will generally be within the range of about 0.1 to 10 percent, based on the weight of the finished cheese. Preferably the non-dairy protein isolate is added as a powdered solid.

The purpose of adding salt (sodium chloride) at this stage of the process is to achieve better quality control than is maintained by simply contacting the curd or cheese with salt at an earlier step in the process. The cheese's flavor can be adversely affected if its salt concentration strays outside the target range. The process of the present invention makes it easier to hold the salt concentration within desired limits. Although it may be added in the form of an aqueous solution, preferably the salt is added in granular form. If used, the salt will generally be added at a level of about 0.1 to 5 percent, based on the weight of the finished cheese.

Sometimes, when the exposed cheese on a pizza completely melts, it appears as though the cheese has been "cooked into" the sauce. To the consumer, the topping on the pizza can appear to have less cheese than is desired or expected. In the industry this is referred to as the pizza appearing "thin" or having a "poor yield." We have found that the addition of a solid food additive between steps (e) and (f) tends to obviate this problem. Starch can be added for this purpose. Generally the amount of starch should be in the range of about 0.5 to 10 wt. %, most commonly in the range of about 1 to 4%. Preferably the starch is not mixed with water before being added to the cheese.

Suitable starches include both vegetable starches, such as potato starch, pea starch, and tapioca, and grain starches, such as corn starch, wheat starch, and rice starch. The starch can be modified or native. Suitable corn starches include dent corn starch, waxy corn starch, and high amylose corn starch.

Modified food starches differ in their degree of cross-linking, type of chemical substitution, oxidation level, degree of molecular scission, and ratio of amylose to amylopectin. Examples of some commercially available modified food starches that are generally suitable for obviating the "poor yield" problem include Mira-Cleer 516, Pencling 200, Purity 660, Batterbind SC, Penbind 100, and MiraQuick MGL. A suitable, commercially available native (unmodified) starch is Hylon V.

Mira-Cleer 516, from A. E. Staley Company, is a dent corn starch that is cross-linked and substituted with hydroxypropyl groups. The cross-linking increases its gelatinization temperature and acid tolerance. The hydroxypropyl substitution increases its water binding capability, viscosity and freeze-thaw stability. MiraQuick MGL, also from A. E. Staley Company, is an acid-thinned potato starch. The acid thinning breaks amylopectin branches in the starch, creating a firmer gel.

Pencling 200, from Penwest Foods, is an oxidized potato starch. The oxidation increases its capacity to bind water and protein. Penbind 100, also from Penwest Foods, is a cross-linked potato starch.

Batterbind SC, from National Starch, is a cross-linked and oxidized dent corn starch. Purity 660, also from National Starch, is a cross-linked and hydroxypropyl substituted dent corn starch. Hylon V, also from National Starch, is an unmodified, high amylose corn starch.

All of the specific starches mentioned above are "cook-up" starches—that is, they are not pre-gelatinized. Pre-gelatinized starches can also be used in the process of the present invention, however.

We have also observed that some food starches tend to affect the texture of the melted cheese as well. Use of the commercial products Mira-Cleer 516, Purity 660, and MiraQuick MGL tends to make the finished cheese softer when baked, whereas use of the commercial products Pencling 200, Batterbind SC, Hylon-V, and Penbind 100 tends to make the finished cheese firmer when baked. The use of a starch that tends to make the cheese softer when baked is especially advantageous when manufacturing a string cheese intended to be used for a stuffed crust pizza.

As indicated, the food additive is mixed into the heated cheese after the cheese has undergone some kneading and stretching, but before it is formed into a shape and cooled in brine. Preferably the cheese will be at a temperature of no more than about 160° F. (71° C.), e.g., in the range of about 110 to 160° F. (43 to 71° C.) when the additive is added to it. The temperature is most preferably below that of pasteurization (65° C., 150° F.), for example in the range of about 110 to 145° F. (43 to 63° C.), and the temperature of the cheese is preferably not subsequently raised to as high as pasteurization temperature.

The heating, kneading, and stretching of the cheese curd is typically done in a piece of equipment called a mixer/cooker. In the prior art the heated, fibrous mass has then been extruded into a desired shape and deposited into a tank of cold brine. In the present process, separate mixing equipment can be installed between the mixer/cooker and the extruder at the brine tank, to mix one or more additives into the cheese before cooling. Any mixing equipment that will thoroughly blend the additive or additives into the heated cheese can be used. As examples of equipment that may be used, alone or in combination with other equipment, may be mentioned apparatus like that described in U.S. Pat. No. 4,682,538 to Zahlaus for mixing salt into cheese curd; apparatus like that described in U.S. Pat. No. 4,448,116 to Muzzarelli, also for the dry salting of curd; apparatus like the salting unit described in U.S. Pat. No. 3,445,241 to Pontecorvo et al.; and apparatus like that described in U.S. Pat. No. 3,078,170 to Leber for spreading dry salt over curd. Other apparatus that might be used are disclosed in U.S. Pat. No. 4,902,523 to Fritchen et al., U.S. Pat. No. 4,592,274 to Tomatis, and U.S. Pat. No. 4,110,484 to Rule et al. All of these patent disclosures are incorporated herein by reference.

Liquid additives can be continuously sprayed down onto the surface of the moving cheese, preferably in a spray that covers substantially the entire surface. Powdered solids can be sprinkled onto the cheese, preferably across the entire surface and preferably after the liquid additive, if any, is applied.

The additive-carrying cheese ribbon may then be fed into a twin auger mixer. Preferably the augers will be arranged so that they overlap, ensuring thorough mixing. If desired, the twin auger mixer can be jacketed, so as to keep the temperature of the cheese from dropping. The thoroughly mixed cheese and additive(s) may then be extruded into the brine tank.

The size and configuration of the mixing equipment are preferably such that the dwell time of the cheese (with the additive(s)) in the equipment is in the range of about 2 to 10 minutes, and the movement of cheese from the mixer/cooker to the brine tank is continuous.

Steps (a) through (h) of the above-described process are known to those skilled in the art. Preferably, these steps will be controlled and performed so that the finished cheese, after removal from the brine, will have a moisture content in the range of about 45 to 60 wt. % and a milkfat content of at least 30 wt. % (on a dried solids basis).

Step (b), the milk acidification step, can be performed either microbially or directly. Microbial acidification is accomplished by the addition of a starter culture of one or more lactic acid-producing bacteria to the milk, and then allowing the bacteria to grow and multiply. Direct acidification is faster and is accomplished by the addition of a GRAS acid, such as, for example, acetic acid (e.g., as vinegar), phosphoric acid, citric acid, lactic acid, hydrochloric acid, sulfuric acid, or glucoso-delta-lactone (GDL) to the milk.

After the incorporation of the food additive, the still-warm cheese (e.g., at a temperature in the range of about 100 to 135° F. (38 to 57° C.)) can be formed into any desired shape. Typically, it will be extruded at that temperature in a continuous ribbon, which is discharged into a cold sodium chloride brine channel or tank, for example as described in U.S. Pat. No. 4,339,468 to Kielsmeier or U.S. Pat. No. 5,200,216 to Barz et al., both of which are hereby incorporated herein by reference. The cheese ribbon is preferably contacted with cold sodium chloride brine (in one or more tanks or vessels) until its core temperature drops to about 75° F. (24° C.) or below. Then the cooled ribbon is cut into segments.

If the product is string cheese, e.g., having a diameter of about ¼ to ¾ inch (0.6 to 2 cm.), the segments of the ribbon will generally be about 1½ to 8 inches (4 to 20 cm.) long. If the string cheese is not to be baked, or if it is to be baked only while enclosed in pizza crust, e.g., in a stuffed crust pizza, it will generally not be necessary to age the cheese before using it. If desired, the string cheese may be frozen and stored.

If it is intended to use the cheese as exposed topping for a pizza, then the continuous ribbon, which will preferably be rectangular in cross section, may be cut into loaves, for example having a width of about 12 to 36 inches (30 to 91 cm.), a height of about ½ to 2 inches (1.3 to 5 cm.), and a length of about 14 to 24 inches (36 to 61 cm.). The loaves can then be further cooled in sodium chloride brine, for example to a core temperature in the range of about 28 to 45° F. (−2 to 7° C.), and then removed from the brine and comminuted, and the pieces individually quick frozen, for example by the process described in U.S. Pat. No. 5,030,470 to Kielsmeier, et al., which is hereby incorporated herein by reference.

Depending on the composition of the cheese, it may be preferable to store it for a time (e.g., about 7 to 21 days, at about 35 to 45° F. (2 to 7° C.)) after it is removed from the last brine tank and before it is comminuted and frozen. However, as described in U.S. Pat. No. 5,200,216 (Barz et al.), if the process is controlled so that the cooled cheese removed from the brine has a moisture content of about 45 to 60 wt. %, a milkfat content of at least about 30 wt. % (dried solids basis), and a combined moisture and wet milkfat content of at least about 70 wt. %, the cheese can be frozen immediately and will still perform satisfactorily when baked on a pizza, under a variety of conditions.

When an emulsifying agent is used, the process of the present invention enables one to prepare a soft or semi-soft fibrous cheese that can provide optimum baking performance over a wider range of conditions than can cheese in which an emulsifying agent is not incorporated, or in which the emulsifying agent is incorporated only by being coated on the finished cheese particles. This is important, because the pizza industry, as well as other users of soft or semi-soft fibrous cheeses, has been increasing the variety of prepared foods in which such cheeses need to be baked. Also, an increasing variety of baking equipment and conditions are being used. In the pizza industry, for example, the crust may be thin, thick, or in between; the cheese may be exposed or wrapped in the edge of the crust; and the crust may be completely uncooked or it may be parbaked before being put in the oven with the cheese. In addition, oven types and temperatures vary from one pizza restaurant to another. Some baking operations require relatively high oven temperatures (e.g., in the range of about 600 to 750° F. (315 to 399° C.)) with short baking times (e.g., in the range of about 5 to 10 minutes). Such conditions may be used, for instance, in an impingement oven when baking a pizza having a thin crust. Contrastingly, a pizza restaurant might use a relatively long bake time (e.g., about 12 to 20 minutes) and a correspondingly lower oven temperature (e.g., about 450 to 550° F. (232 to 288° C.)). Such conditions are more commonly employed in deck ovens, when making thick-crust pizzas.

Prior to the present invention, a cheese manufacturer could usually design a soft or semi-soft fibrous cheese that would suit any particular set of baking conditions, for example by altering the moisture or milkfat content of the cheese or the length of time the cheese is stored at above-freezing temperatures before it is shipped. Different combinations of these variables could be selected to groom the cheese for optimum performance for a particular set of baking conditions. However, it has been generally true until now that a cheese that is optimum for one set of baking conditions, or a particular type of product, will be less than satisfactory for some other set of baking conditions or product type.

In addition, when using a particular set of these cheese-making variables in order to achieve optimum baking performance under a particular set of conditions, a drawback sometimes experienced is that the handling properties of the cheese are less than satisfactory. If the cheese needs to be comminuted (e.g., diced or shredded) before it is used, for example as the exposed cheese on a pizza crust, it needs to have a certain minimum firmness in order for the comminuting process to proceed efficiently. Also, once comminuted, the particles need to flow relatively freely, to permit the cheese to be portioned out accurately and easily. Either or both of these characteristics can be adversely affected by selecting the set of conventional cheese-making variables that is best suited for a particular baking demand. We have experienced poor handling properties, for example, when trying to prepare a mozzarella variety cheese for use under cook conditions in which minimal heat reaches the cheese. By judicious selection of conditions such as moisture and fat content we have been able to make a mozzarella that bakes perfectly (ideal blister size, coverage, color, and integrity, and good stretch and texture) on a thick-crust pizza at an oven temperature of about 500° F. (260° C.). However, the cheese does not handle well, in that it is too soft to comminute, resulting in poor cut integrity and difficulty in measuring out the cheese by use of portion cups.

We have found that the process of the present invention, when used to incorporate an emulsifying agent at the particular stage in the cheese-forming process as described above, allows one to make a soft or semi-soft fibrous cheese that can perform optimally under a broader variety of baking conditions. Moreover, these desirable baking properties can be attained without significant degradation of the cheese's handling properties. Thus, by incorporation of the appropriate amount of emulsifying agent, one can achieve a cheese that will bake very well on top of a pizza, even under such difficult conditions as the combination of a thick crust, long baking time, and deck style oven, yet still be relatively easy to comminute and pour. (Deck style ovens are normally a poor choice for baking a pizza under these conditions, because they produce radiant and conductive heat, which is relatively slow to raise the temperature of the cheese. Impingement ovens, which heat mostly by forced air convection, generally perform better when baking a thick-crust pizza. But impingement ovens are relatively expensive, and many pizzerias are only equipped with deck ovens.)

Also, by the process of the present invention a string cheese can be prepared that performs better as a stuffing cheese for stuffed crust pizzas than many other cheeses that are generally commercially available in string form. In a stuffed crust pizza, a mozzarella-style string cheese is rolled into the edge, or "lip," of the pizza dough prior to baking. The pizza is then prepared in the traditional manner, with sauce, exposed cheese, etc. Upon baking the pizza, both the cheese enclosed in the crust and the exposed cheese are supposed to melt, such that it loses its original shape, and it is supposed to exhibit excellent "stringy" characteristics. When the pizza is cut into slices, the stuffing cheese must not be runny, else it will quickly flow out of the crust while it is hot. The cheese may become soft enough to very slowly ooze out of the crust, but it should not become so fluid that it runs out before the slice can be lifted to the mouth. And once the pizza has cooled somewhat, the string cheese in the lip of the crust should keep its stringy characteristics, so that when it is bitten into, the cheese will not break off sharply. The process of the present invention, when used to incorporate an emulsifying agent in the cheese, is ideally suited for making such a string cheese.

DETAILED DESCRIPTION

Figure 7:
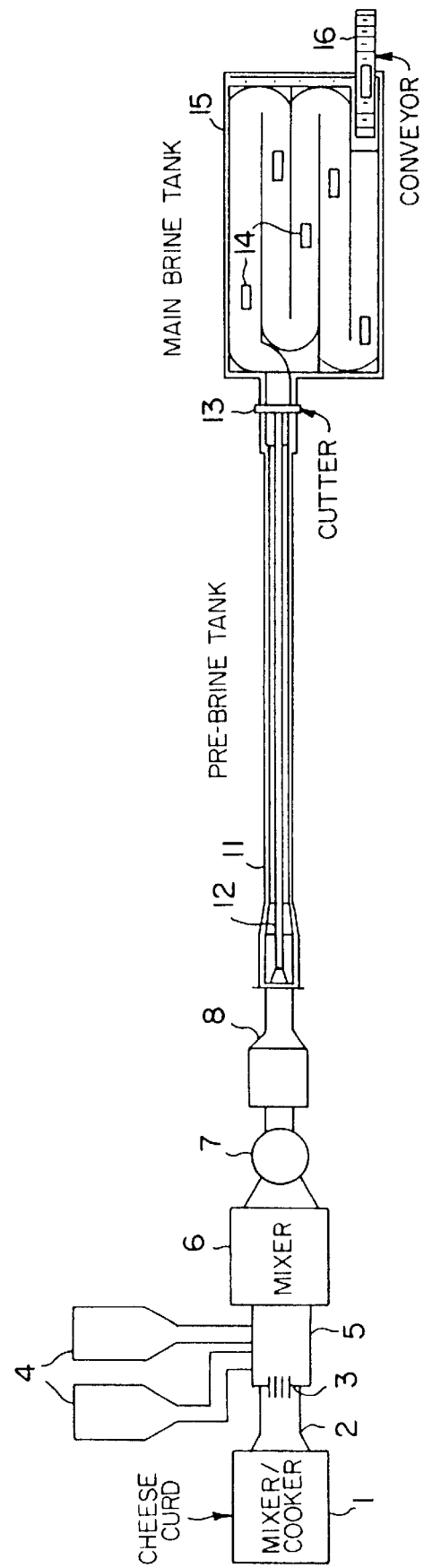
FIG. 7 is a schematic representation of equipment that can be used to practice the process of the present invention.

Referring to FIG. 7, fermented cheese curd is heated in mixer/cooker 1, while being kneaded and stretched to produce molten cheese. The resulting molten cheese is extruded through a transfer tube 2 to form an extruded ribbon of molten cheese. Slitters 3 form grooves in the extruded ribbon of molten cheese. The grooved, extruded ribbon is fed into an additional mixer 6, such as, e.g., a jacketed mixer having overlapping twin screw augers. Disposed between the slitters 3 and the additional mixer 6 is an inlet chamber 5 that enables liquid/dry ingredient applicators 4 to add one or more desired ingredients, e.g., dry starch from one and an aqueous solution of an emulsifying agent from the other, into the ribbon grooves formed in the molten cheese by the slitters 3. The added ingredients are thoroughly mixed into the molten cheese by the additional mixer 6. Positive pump 7 forces the resulting mixture through a transfer tube 8 to form a continuous ribbon 12 of molten cheese. The extruded continuous ribbon 12 of molten cheese flows into "super cold" sodium chloride brine contained in pre-brine tank 11. Cutter 13 cuts the continuous ribbon 12 into cheese loaves 14 as the continuous ribbon 12 exits the pre-brine tank 11. The cooled, salted cheese loaves 14 float in main brine tank 15 until conveyor 16 removes the loaves 14 from the main brine tank 16. The loaves 14 may then undergo further processing as desired.

In the following examples, unless otherwise indicated, all percentages are by weight.

EXAMPLE I

A mozzarella variety cheese was manufactured by the process described in Barz et al. (U.S. Pat. No. 5,200,216) using cow's milk. The process conditions were such that the final product had a moisture content of 53.5%, FDB (fat on a dry basis) of 47.1%, a pH of 5.25, and a salt content of 1.40%. The cheese curd was heated to 120° F. (49° C.), stretched, and kneaded, all in a mixer/cooker. Approximately one-half of the batch was then supplemented with sodium hexametaphosphate (SHMP), by passing the cheese through a twin screw auger mixer, immediately after adding a 50 wt. % aqueous solution of SHMP at a dosage level of one (1) percent SHMP, based on the weight of the cheese. While the temperature of the cheese was held at 120° F. (49° C.), the SHMP solution was thoroughly mixed into the cheese by the action of the twin screws. The average residence time of the cheese in the auger mixer was approximately two (2) minutes. Upon leaving the auger mixer, the cheese was formed into a ribbon, cooled in brine, cut into blocks, comminuted, and individually quick frozen, all as described by Barz et al. (U.S. Pat. No. 5,200,216).

The other half of the batch of molten cheese was finished in a similar manner, but excluding the addition of the SHMP.

Both products were thawed for three days and then cooked on a thick crust pizza, a style of pizza in which desired performance characteristics are often not achieved, due to the relatively low cheese temperatures achieved during cooking. The cheese manufactured without the addition of SHMP did not exhibit the desired, and typical, melt characteristics, in that it lacked meltdown, stretch and browning/blistering, which are expected for mozzarella cheese. The new product, with the addition of the SHMP, did exhibit the desired characteristics. Both cheeses would perform well in some other applications, however—for example when baked on the more conventional thin crust pizza, at an oven temperature of, say, about 480° F. (249° C.)).

EXAMPLE II

Beginning with cow's milk, a mozzarella-like string cheese was produced using the manufacturing process outlined in Kielsmeier et al. (U.S. Pat. No. 3,961,077), which is hereby incorporated herein by reference. The final composition of the product was 52.5% moisture, FDB of 38.6%, pH of 5.20, and a salt content of 2.3%. After the heating/stretching of the curd into a molten mass, 0.8% SHMP (in a 50% aqueous solution) was mixed into one-half of the cheese, at a temperature of 110° F. (43° C.), using the twin screw auger mixer at a residence time of 2 minutes. Then the mixture was formed into a string cheese product. The other half of the molten cheese batch had no emulsifier mixed into it. The products were separately formed into cylinders of approximately ⅝" inch (1.6 cm.) diameter and a length of 7⅝ inches (19 cm.). Then they were brined and chilled in a 10° F. (−12° C.) brine for twenty minutes, following which they were frozen using a frozen carbon dioxide freezer chamber. Both products were then thawed for three days, after which they were rolled into the outer crust (lip) of a pizza and baked under typical pizzeria cook conditions. The resultant products differed significantly, in that the product without the SHMP did not melt, nor did it stretch. It remained virtually intact, making it unacceptable for this application. The string cheese with the SHMP, however, displayed the desired melt and stretch characteristics, allowing the string cheese to be successfully used as the stuffing cheese for a stuffed crust pizza.

EXAMPLE III

Tests were designed to compare the baking properties of, on the one hand, a mozzarella variety cheese and a mozzarella-like string cheese made by the process of the present invention to, on the other hand, a mozzarella variety cheese and a mozzarella-like string cheese made by prior art methods.

Preparation of the Cheeses

Sample 1 (Standard Mozzarella): This was a standard non-aged mozzarella variety cheese, made from cow's milk without the addition of any emulsifying agent. It was made by the process described in U.S. Pat. No. 5,200,216 (Barz et al. '216). After removal from the brine tank, the cheese was diced and individually quick frozen according to the method described in U.S. Pat. No. 5,030,470 (Kielsmeier et al. '470). The frozen, diced cheese was held at 0° F. (−18° C.) until three days prior to use, when it was placed in a refrigerator that was held in the temperature range of about 35–40° F. (2–5° C.). At the end of the three days, the cheese was completely thawed. The cheese had a moisture content of 53.0 wt. %, a fat content of 47.0 wt. % (dry basis), a salt content of 1.4 wt. %, and a pH of 5.25.

Sample 2 (Process Mozzarella Cheese With Sodium Citrate): This was a mozzarella flavor pasteurized process cheese, obtained from Schreiber Foods, Inc., of Green Bay, Wis. The ingredient and nutrition statement indicated that the cheese had been made from a mixture of natural cheddar and mozzarella cheeses and that it contained the emulsifying salt sodium citrate. The amount was not revealed, but it is well known in the cheese industry that sodium citrate is used at a level of about 2 to 3 weight percent when making process cheese. Three percent (3%) is the maximum level permitted under U.S. regulations for a process cheese. Again, although the ingredient and nutrition statement did not indicate at what stage the emulsifier was added, it is well known that process cheese is made by mixing the emulsifying salt into melted hard or soft cheese at a temperature in the range of about 80 to 95° C. During this melting process, the insoluble starting cheeses are converted into liquid by means of the emulsifying salt. After about 4 to 15 minutes, the molten mass is cooled and solidified.

The cheese had been pre-sliced into 3 inch (7.6 cm.) square, ⅛ inch (0.3 cm.) thick slices. It was stored at 40° F. (4° C.) until time of use. The slices were crumbled into small pieces before being placed on the pizza.

Sample 3 (Mozzarella With Sodium Citrate Coating): This was the same cheese as Sample 1, but with a coating of 0.2 wt. % sodium citrate on the cheese particles. The coating was applied by the spraying method described in Kielsmeier '470, using water having dissolved therein 8 wt. % sodium citrate dihydrate.

Sample 4 (Mozzarella of Invention With Sodium Citrate Added at 55° C. After Stretching): This cheese was prepared by the method of the present invention, using a portion of the same batch of cheese curd as was used to make Sample 1. Following the procedure disclosed in Barz et al. '216, the cheese curd was heated, kneaded, and stretched until it was a homogeneous, fibrous mass of mozzarella variety cheese. While the cheese was kept warm (at 130° F. (55° C.)) a 30 wt. % aqueous solution of sodium citrate dihydrate was mixed thoroughly into the molten cheese in an amount sufficient to provide a sodium citrate concentration of approximately 0.2 wt. %. After removal from the brine tank, the cheese was diced and individually quick frozen according to the method of Kielsmeier et al. '470. The cheese had the same moisture, fat, and salt contents as Sample 1, and was handled the same way as that sample prior to testing.

Sample 5 (Mozzarella With SHMP Coating): This cheese was from the same batch as Samples 1 and 3, and was treated in the same manner as Sample 3, except that, instead of using sodium citrate, the cheese was coated with 0.35 wt. % of sodium hexametaphosphate, supplied as a 50 wt. % aqueous solution.

Sample 6 (Mozzarella of the Invention With SHMP Added at 55° C. After Stretching): This cheese was from the same batch of curd as Samples 1 and 4, and was prepared in the same manner as Sample 4, except that, instead of sodium citrate, 0.35 wt. % of sodium hexametaphosphate (supplied as a 50 wt. % aqueous solution) was mixed into the molten cheese.

Sample 7 (String Mozzarella): Part-skim mozzarella cheese curd was manufactured using the procedure described in U.S. Pat. No. 3,961,077. The curd was held overnight at 60° F. (16° C.)). The next day, the curd was heated, kneaded, and stretched and salt was added to it. The molten cheese was extruded into cold sodium chloride brine as a continuous cylinder having a diameter of about ⅝ inch (1.6 cm.). This string was chopped into segments 7⅝ inches (19 cm.) long and then individually quick frozen. The frozen strings were held at 0° F. (−18° C.) until ready for testing. Then they were moved to a 35–40° F. (2–7° C.) refrigerator, where they were held for three days, during which time they completely thawed. The cheese had a moisture content of 52.5 wt. %, a fat content of 38.0 wt. % (dry basis), a salt content of 2.3 wt. %, and a pH of 5.25.

Sample 8 (String Mozzarella of the Invention With SHMP Added at 55° C. After Stretching): This cheese was prepared by the method of the present invention, using a portion of the same batch of cheese curd as was used to make Sample 7. In this preparation, however, after the cheese curd was heated, kneaded, and stretched, and while it was kept warm (at 130° F. (55° C.)), a 50 wt. % aqueous solution of SHMP was mixed thoroughly into the molten cheese in an amount sufficient to provide a SHMP level of approximately 0.8 wt. %. The cheese had the same moisture, fat, and salt contents as Sample 7, and was handled in the same manner prior to testing.

Method of Testing

Each sample of comminuted cheese was evaluated as a topping on a 12-inch (30.5 cm.) diameter pizza, baked in a pan in a Blodgett deck oven at 500° F. (260° C.) for 9 minutes. The crust, weighing 17.5 oz. (496 g.), had previously been par-baked—i.e., placed in a 350° F. (177° C.) conveyor oven for three minutes. Each pizza had 4.0 oz. (113 g.) of tomato-base pizza sauce applied and 8.0 oz. (227 g.) of the test cheese sprinkled on top of the sauce. Nine minutes was the required length of time for the crust to be correctly baked. This combination of pizza style (a relatively thick crust) and type of oven (a relatively low temperature) represents perhaps the most difficult set of conditions for achieving ideal results simultaneously in all of the different baking performance categories, i.e., blistering, oil-off, meltdown, stretch, etc.

As for the string cheese samples, these were rolled into the outer rim of unbaked pizza dough, to make a stuffed crust pizza. Six lengths of the string cheese were used per pizza, to make a continuous ring, encased in dough. The total dough weight per pizza was 25 oz. (709 g.), and the finished pizza diameter was 12 inches (30.5 cm.). The amount of pizza sauce used was 4.0 oz. (113 g.), while the amount of comminuted, non-test mozzarella that was sprinkled over top the pizza sauce was 9.9 oz. (281 g.). The pizza, with the string cheese rolled into the outside rim, was baked in a pan in a Blodgett Master Therm Oven at 480° F. (249° C.) for 8 minutes (the required time for optimum condition of the crust).

Evaluation of Performance

Figure 1:
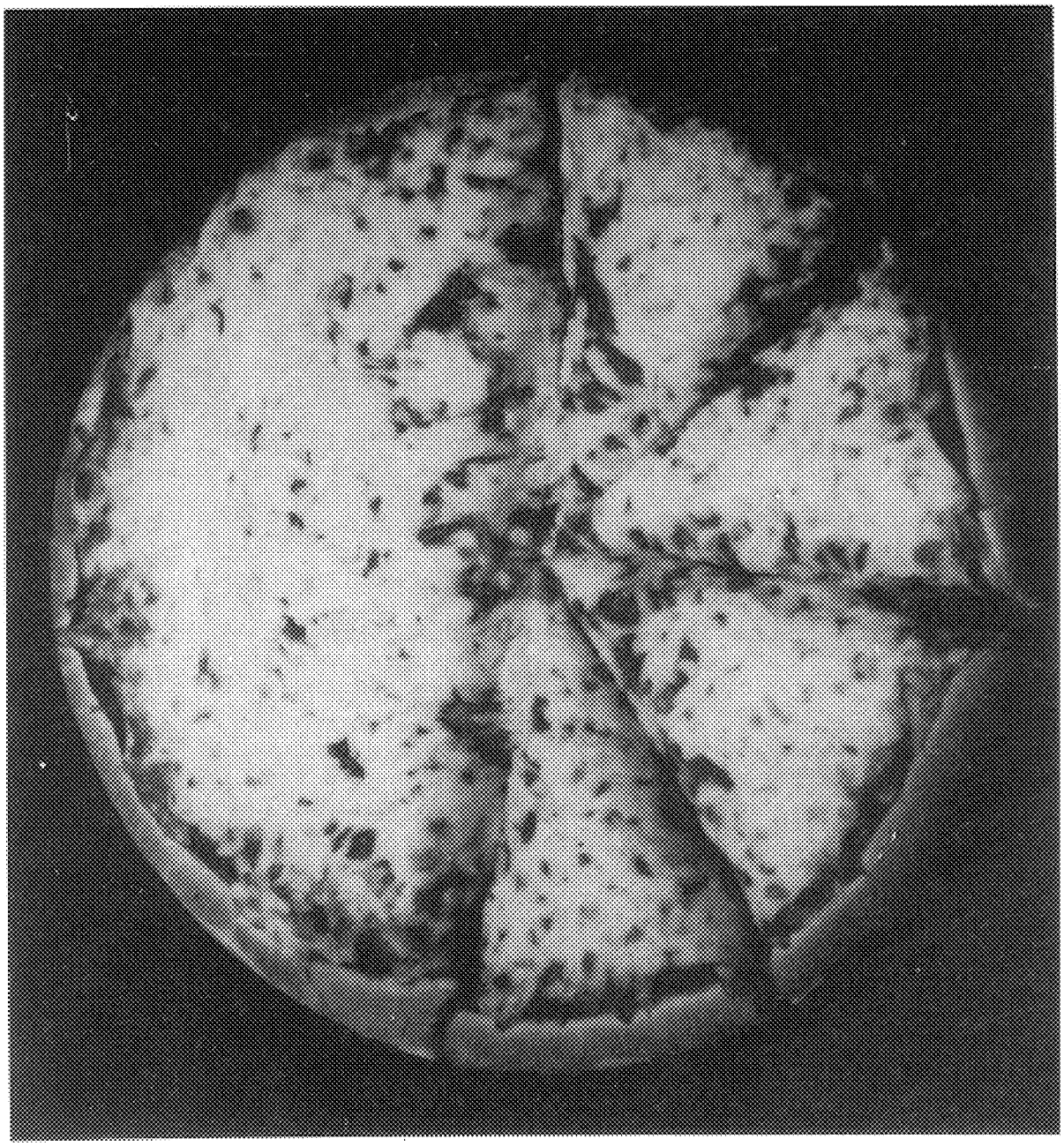
FIGS. 1 through 6 are photographs of actual pizzas made in a comparative test described later herein, as Example III. The pizzas of FIGS. 1, 2, 3, and 5 were baked using cheese made by prior art processes. The pizzas of FIGS. 4 and 6 were baked using cheese made by the process of the present invention.
Figure 2:
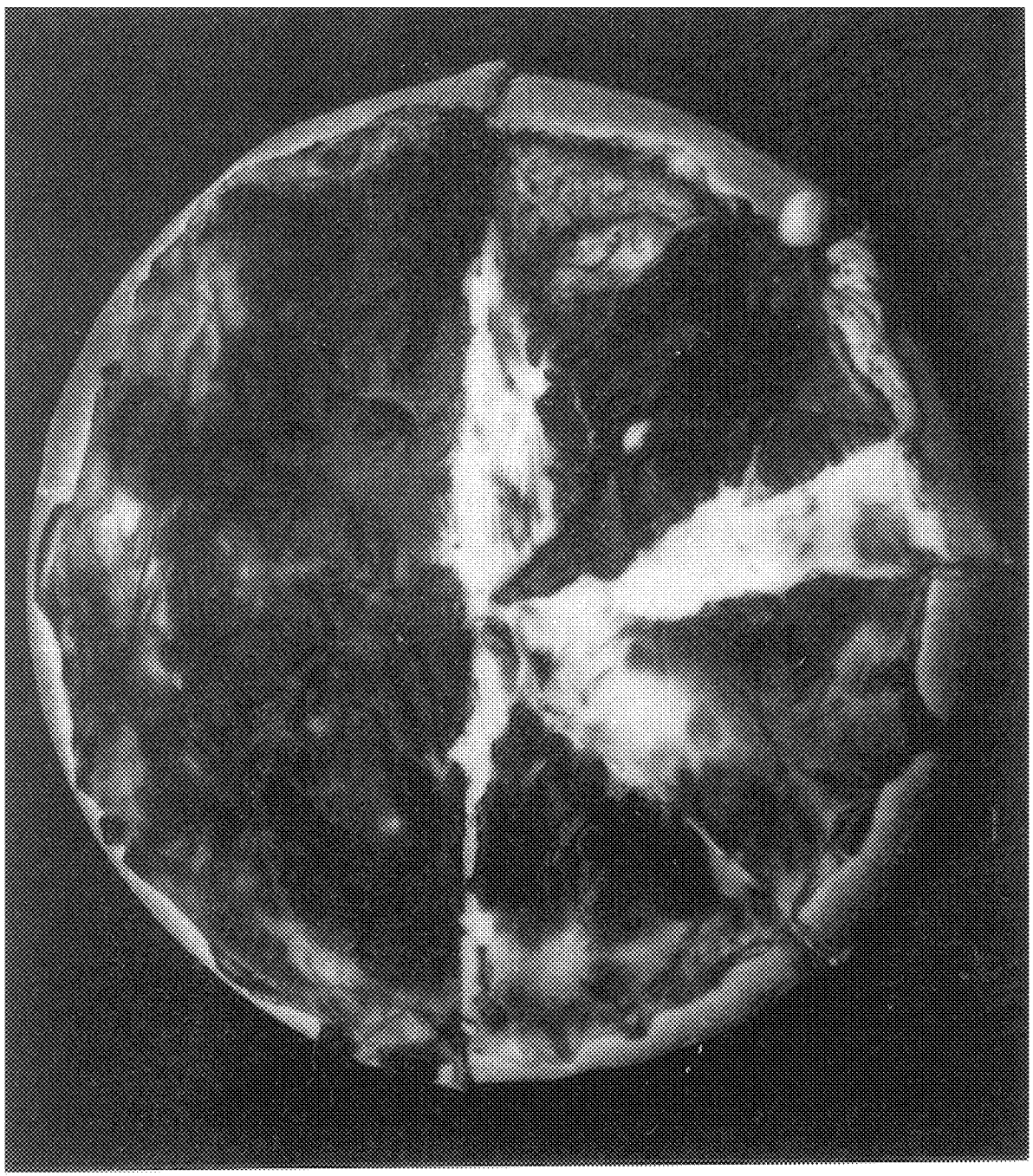
Figure 3:
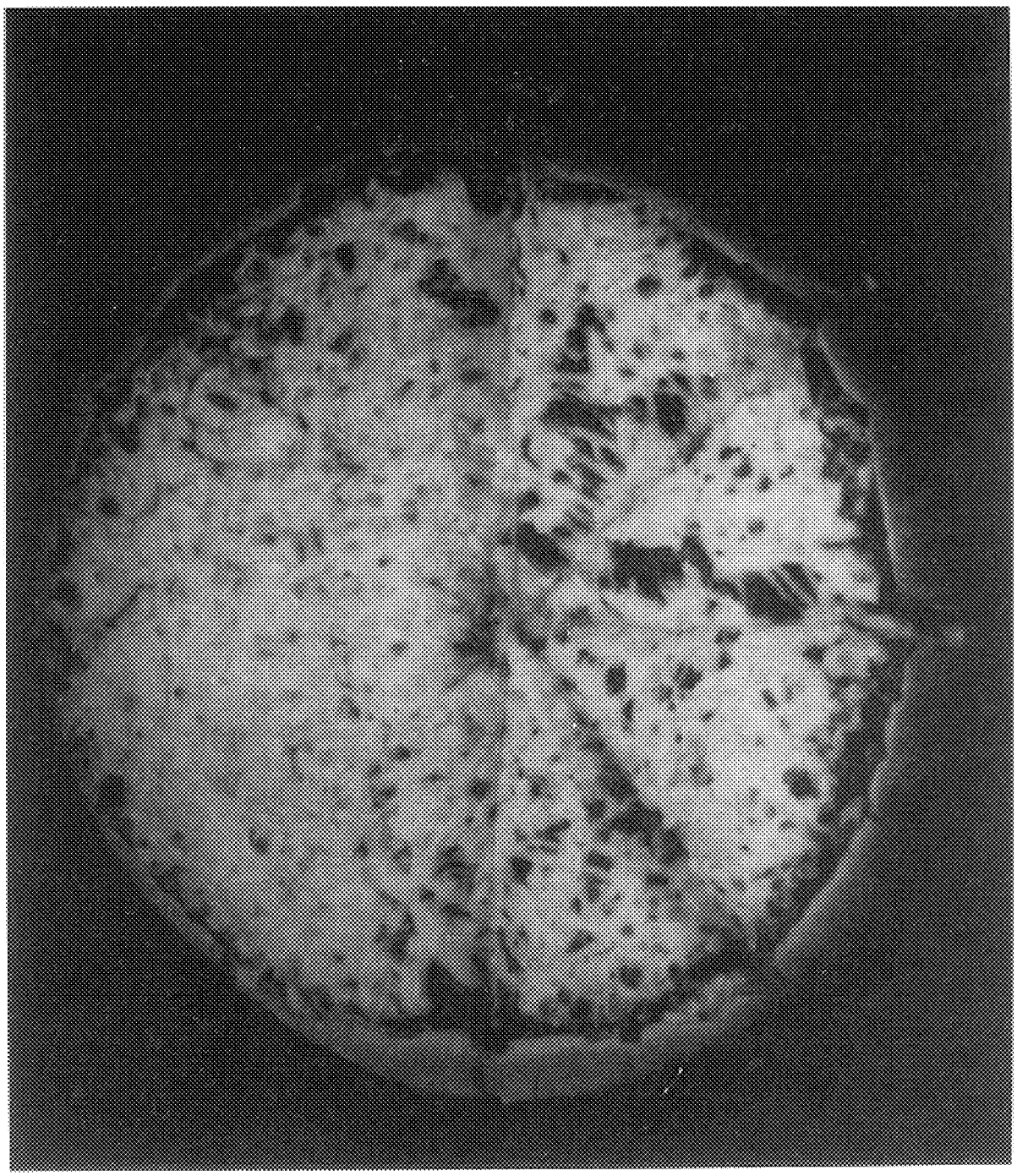
Figure 4:
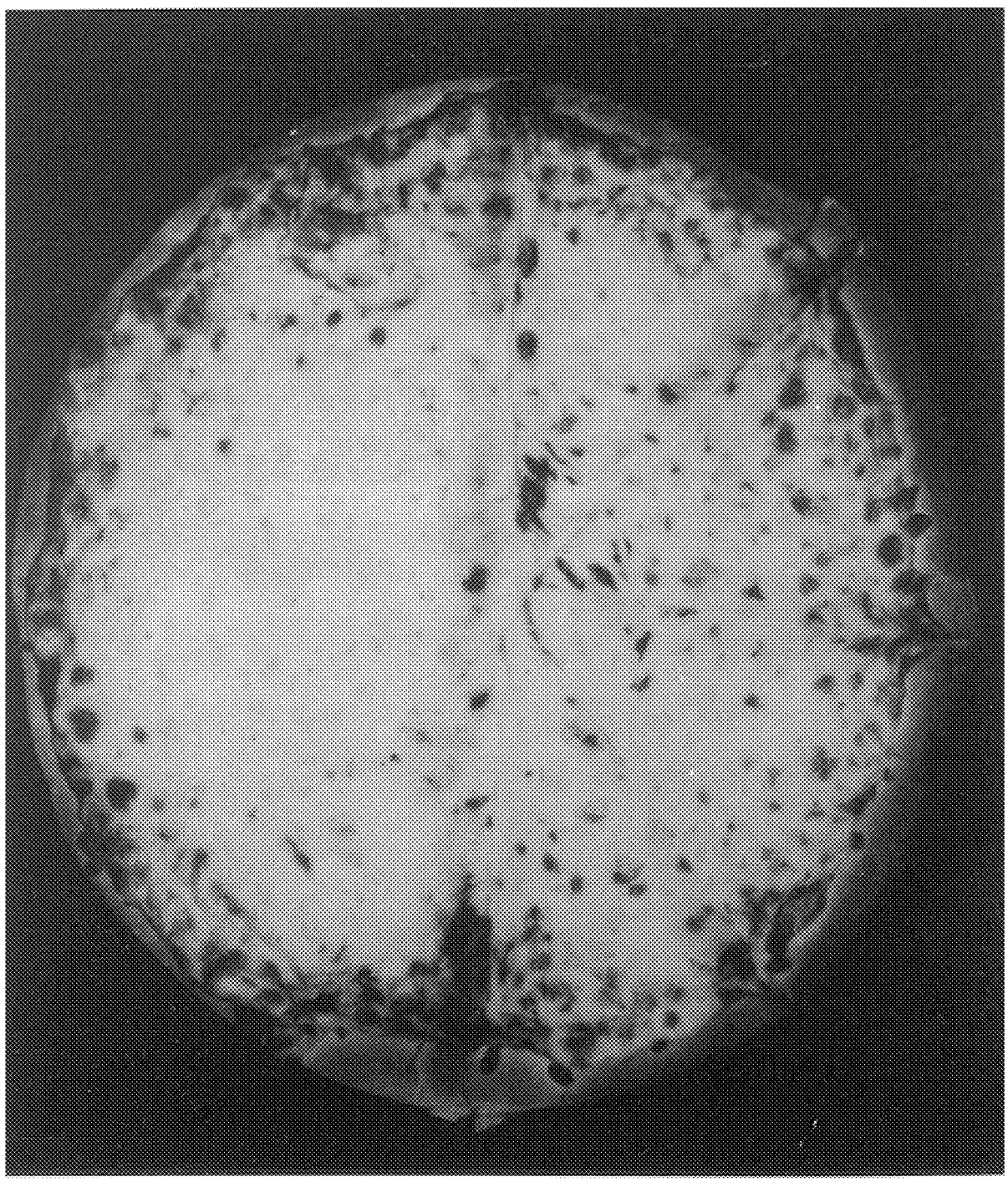
Figure 5:
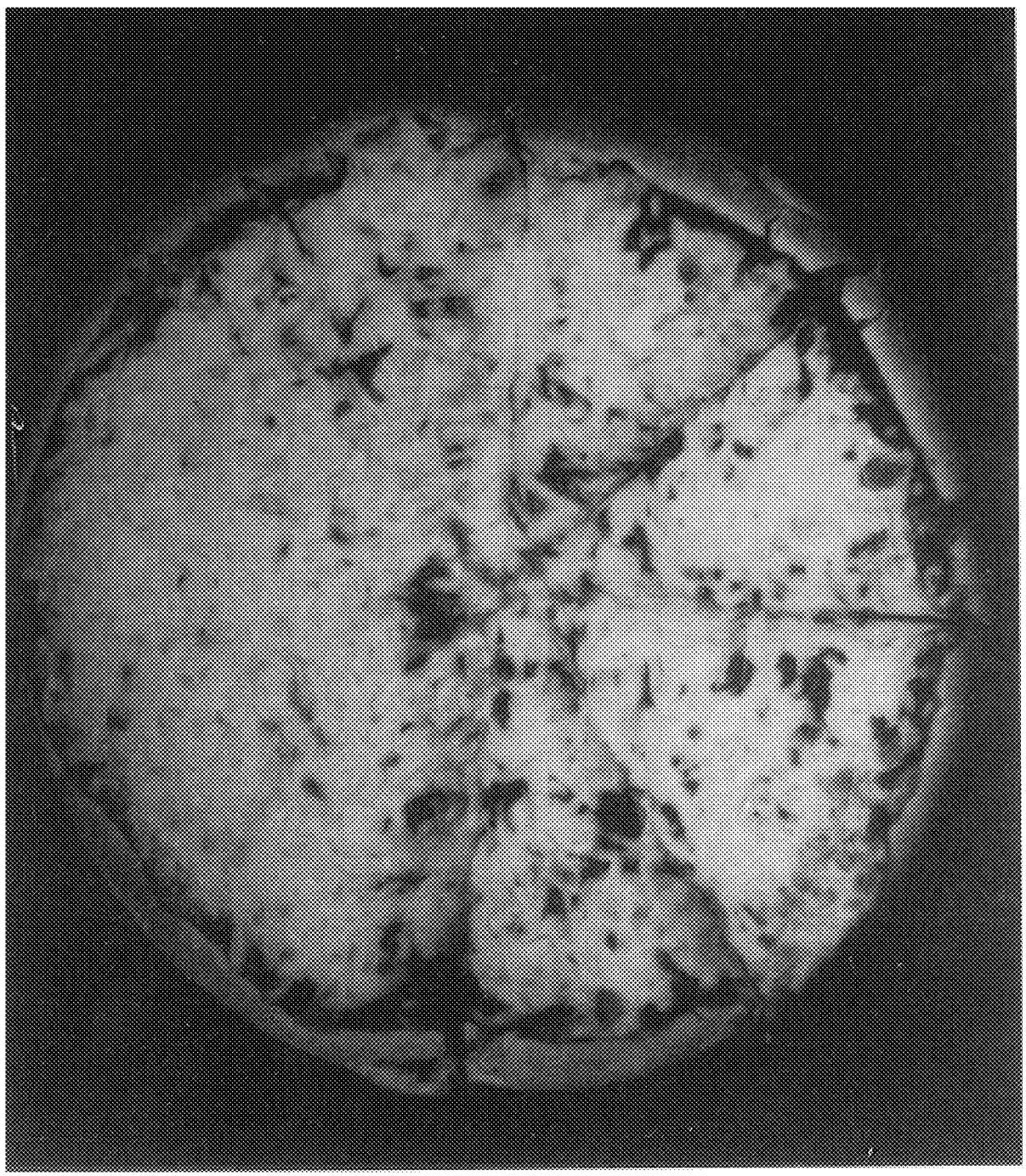
Figure 6:
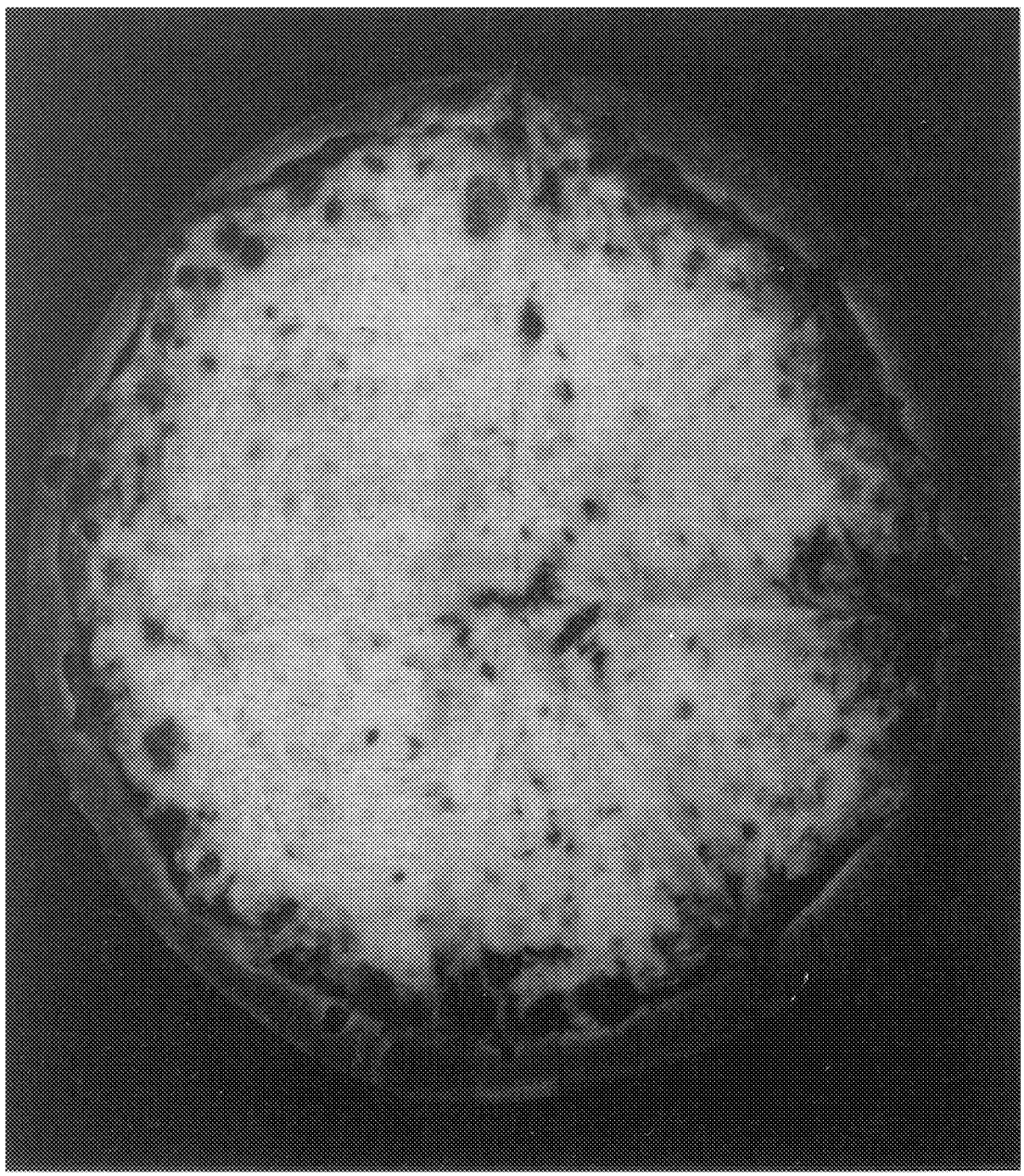

When used in comminuted form, sprinkled on top of the pizza sauce, each test cheese was evaluated for extent of blistering, the size of the blisters, the color of the blisters, the integrity of the blisters (whether isolated or run together), the degree of oiling off, melt performance, and stretchability. Photographs of the six resultant pizzas constitute FIGS. 1–6 of the drawings accompanying this specification. FIG. 1 is a photograph of the pizza made with the "Sample 1" cheese described above. FIG. 2 is a photograph of the pizza made with the "Sample 2" cheese, and so forth.

When used in the string form, as stuffing cheese, each sample was evaluated in terms of its stretchability and texture. Since neither of these qualities is easy to demonstrate visually, no photographs of these two pizzas are provided.

Below is the grading chart that was used. A perfect cheese would be one that scored "A" in all performance categories.

| BAKE PERFORMANCE SCORING FOR MOZZARELLA VARIETY CHEESES | | | | | |
|---|---|---|---|---|---|
| GRADE: | A | B | C | D | F |
| BLISTER COVERAGE | 10–25% | $B_1$: 0–10%<br>$B_2$: 25–50% | — | 50–75% | >75% |
| BLISTER SIZE | ⅛–¼"<br>(0.3–0.6 cm.) | ⅜–½"<br>(1–1.3 cm.) | ⅝–¾"<br>(1.6–1.9 cm.) | ⅞–1"<br>(2.2–2.5 cm.) | >1"<br>(>2.5 cm.) |
| BLISTER COLOR | Brown | Golden to Light Golden | $C_1$: Light Golden<br>$C_2$: Dark Brown | — | Black |
| BLISTER INTEGRITY | Blisters are generally round and fairly flat to the cheese surface. Very limited scorching. | Can identify some of the original cheese form, but has lost all hard edges. E.g., has soft peaks. Some minor scorching may be present. | Some scabbing taking place. Blisters may begin to mix together in several areas. | Definite signs of original form of cheese, e.g., as dice or shred. Usually heavily scorched. Hard peaks if diced. Hash-brown potato appearance if shredded. | Heavily scabbed blisters that may run together. Generally heavily scorched. May be abnormally large, and flat, with a light brown color. |
| OILING OFF | Even sheen over cheese surface. Cheese glistens. | Some minor areas with slight pooling, but no heavy coating. No runoff. | $C_1$: No visible oil. Cheese is very dry in appearance.<br>$C_2$: Noticeable oil collection areas. Moderately heavy coating of oil. Tends to run off side of pie when tilted. | — | Entire surface very heavily coated with oil. Easily runs. Easily runs off edge of pie, especially if tilted. |
| MELTDOWN | Cheese pieces completely fused together. No transparency. Very full appearing yield. Cheese resists flowing off edge of pie. | $B_1$: Cheese pieces appear fused together, but may show minor jigsaw puzzle appearance when pulled apart. May be slightly curdy in appearance.<br>$B_2$: Cheese is slightly soupy. Sauce appears to bleed through surface of cheese. May be transparent or weak-looking. | — | — | $F_1$: Cheese does not fuse together after cooking. May show a slight jigsaw puzzle appearance.<br>$F_2$: Cheese is very runny, soupy. Appears very weak in body, with excessive number of sauce holes. May appear very creamy. |
| STRETCH | >7"<br>(>18 cm.) | 5–7"<br>(13–18 cm.) | 3–5"<br>(8–13 cm.) | 1½–3"<br>(3.8–8 cm.) | 0–1"<br>(0–2.5 cm.) |
| TEXTURE | Tender. Does not disintegrate in mouth when chewed. | — | $C_1$: Slightly tough, chewy or mealy.<br>$C_2$: Somewhat overly tender. Seems to almost disintegrate when chewed. | — | $F_1$: Very tough, chewy or mealy.<br>$F_2$: Cheese has no body when chewed. Disintegrates in mouth. |

Test Results

The results of the tests are tabulated and shown in the following table (Table I):

Sample 2 demonstrates that when the emulsifying agent is added in the way that is employed for making mozzarella-base process cheese (at a temperature in the range of about

TABLE I (Example III)

Performance Grades when Baked On A Thick-Crust Pizza

| Cheese Sample | | Blister Coverage | Blister Size | Blister Color | Blister Integrity | Oiling Off | Meltdown | Stretch | Texture | Other Observations |
|---|---|---|---|---|---|---|---|---|---|---|
| No. | Type | | | | | | | | | |
| 1 | Mozzarella w/o Emulsifier | $B_1$ | A | B | B | A | $F_1$ | F | — | Water on the cheese. |
| 2 | Mozzarella-Based Process cheese. Na citrate added at 80–95° C. | N/A | N/A | N/A | N/A | N/A | N/A | N/A | — | Cheese surface completely burned. |
| 3 | Mozzarella w/Na citrate coated on later. | $B_1$ | A | A | B | A | $F_1$ | C | — | Water on the cheese. |
| 4 | Mozzarella w/Na citrate added to molten cheese at 55° C. | A | A | A | A | B | A | A | — | Less than ideal yield appearance. |
| 5 | Mozzarella w/SHMP coated on later. | $B_1$ | A | B | A | A | $F_1$ | D | — | |
| 6 | Mozzarella w/SHMP added to molten cheese at 55° C. | $B_1$ | A | A | A | B | A | B | — | Less than ideal yield appearance. |
| 7 | String Mozzarella | — | — | — | — | — | — | — | C | $C_1$ | |
| 8 | String Mozzarella w/SHMP added to molten cheese at 55° C. | — | — | — | — | — | — | — | A | A | |

The test results indicate that the three cheeses prepared by the process of the present invention, Sample Nos. 4, 6, and 8, performed demonstrably better than all of the other cheeses in the test.

Sample No. 1, the mozzarella variety cheese without any emulsifying agent, while a perfect cheese for some pizza-baking conditions, exhibited poor meltdown and stretch properties (it earned F's for both categories) when used under the conditions of this test, i.e., a relatively low baking temperature and a thick crust. The cheese particles were not fused together after baking (they largely retained their original shred shape—see FIG. 1), and the cheese would not stretch more than one inch (2.5 cm.). Moreover, there was standing water on the cheese.

Samples 3 and 5 illustrate that when an emulsifying agent was coated on the diced cheese, the stretchability was improved somewhat (to a grade of C and a grade of D), but not the meltdown properties. Still the shredded cheese particles would not fuse together well, earning both cheeses a grade of F for meltdown. (See FIGS. 3 and 5.) As for the water problem, that was corrected in Sample 5, but not in Sample 3.

80 to 95° C.) the product is totally unsuitable for use as pizza cheese under the test conditions. The surface of the cheese burned completely. (See FIG. 2.)

Only by incorporating the emulsifying agents in the manner of the present invention (Samples 4 and 6) were we able to improve the standard mozzarella variety cheese of Sample No. 1 to the point where it earned acceptable grades for meltdown and stretchability (three A's and one B), as well as A's and B's for all of the other baking performance categories.

The prior art string mozzarella cheese, Sample No. 7, scored only C's for stretchability and texture. It stretched about 3 to 5 inches (8–13 cm.), was slightly tough to chew, and had a mealy texture. When that same cheese was prepared by the process of the present invention, with sodium hexametaphosphate added to the molten cheese at 130° F. (55° C.), after the cheese had been heated, kneaded, and stretched (Sample 8), both scores improved to A's. The cheese stretched greater than 7 inches (18 cm.), was tender, but did not disintegrate in the mouth when chewed.

Without wishing to be bound by theory, we believe that the reason cheese produced by the process of the present invention performs differently when baked, from mozzarella-based process cheese, may, at least in part, be due to the different protein structure of the two cheese compositions at the time of the blending in of the emulsifying agent. In the present process the curd has not undergone the proteolysis that process cheese has undergone at that stage. Also, it is believed that the use of a lower temperature to incorporate the emulsifying agent in the present process may be another reason for the improved results vis-a-vis mozzarella-based process cheese, in which the cheese composition is heated to a temperature of about 80 to 95° C. when the emulsifier is mixed into it.

EXAMPLE IV

Using the same grading chart as in Example III, a similar comparison to those described in Example III was performed, but between a cheese into which SHMP alone had been blended and a cheese into which a combination of SHMP and a modified food starch had been blended.

Sample 9 (Mozzarella With SHMP Alone): This cheese was prepared as in Sample 6, with 0.35 wt. % of the emulsifying salt SHMP thoroughly blended into the cheese. The finished cheese had a moisture content of 53.0 wt. %, 47% FDB, a salt content of 1.8 wt. %, and a pH of 5.25.

Sample 10 (Mozzarella with SHMP and Starch): This cheese was from the same batch as Sample 9 (coming out of the mixer/cooker) but 1.5% of Mira-Cleer® 516 modified corn starch was mixed into the cheese, along with 0.35 wt. % of SHMP. The starch was added in dry form. The SHMP was again added as an aqueous solution.

Method of Testing

Each cheese was evaluated on a thin-crust pizza, using 14 oz. (397 g.) of dough on a 12-inch (30.5 cm.) pizza, with 4.0 oz. (113 g.) of tomato sauce and 5.0 oz. (142 g.) of the shredded cheese. The pizza was cooked in a Blodgett deck oven for 8.5 minutes at 500° F. (260° C.). This is the type of pizza in which the problem of a poor yield appearance most often occurs—namely, a thin-crust pizza with a relatively small portion of cheese.

Test Results

The results of the tests are tabulated and shown in the following table (Table II):

oiling off. Whereas the cheese with SHMP alone blended into it scored "F's" in both of those categories, the cheese containing both SHMP and the modified food starch scored "A's." The key visual result, therefore, was in improvement of apparent yield. Whereas the cheese containing only SHMP (Sample 9) yielded a finished pizza in which the cheese was melted into the sauce, in the pizza made with the cheese containing both SHMP and starch (Sample 10), the baked cheese looked creamier and fuller and rode above the sauce.

EXAMPLE V

Again using the same grading chart as in Example III, comparisons on thick-crust pizzas were made between mozzarella cheese with SHMP alone blended in and mozzarella into which a combination of SHMP and a second food additive (other than starch) was blended in. The samples did not come from the same batch (as in Examples III and IV), but where a significant difference in bake performance is seen, it is reasonable to attribute that difference, at least in part, to the difference in additives.

Sample 11 (With SHMP Alone): This cheese was made in essentially the same manner as Sample 6 in Example III, with 0.35 wt. % of SHMP mixed into the molten cheese in the form of a 50 wt. % aqueous solution. The finished cheese had a moisture content of 53.2 wt. %, a fat content of 46.9 wt. % (dry basis), a salt content of 1.6 wt. %, and a pH of 5.33.

Sample 12 (With SHMP and Whey Protein Concentrate): This cheese also was prepared in essentially the same manner as Sample 6 of Example III, except that whey protein concentrate, a dairy solid, was added (in addition to the SHMP) at a concentration of 1.5 wt. %. The whey protein concentrate, which was obtained from Leprino Foods Company, of Denver, Colo., was added as a powder. The finished cheese had a moisture content of 50.70 wt. %, a fat content of 41.58 wt. % (dry basis), a salt content of 1.3 wt. %, and a pH of 5.23.

Sample 13 (With SHMP and Soy Protein): This cheese also was prepared in essentially the same manner as Sample 6 of Example III, except that 1.5 wt. % soy protein, a non-dairy protein isolate, was blended into the cheese along with the 0.35 wt. % of SHMP. The soy protein, which was obtained from Protein Technology International, of St. Louis, Mo., was added as a powder. The finished cheese had

TABLE II (Example IV)

Performance Grades when Baked On A Thin-Crust Pizza

| Cheese Sample | | Blister | | Blister | | | | | | Other |
|---|---|---|---|---|---|---|---|---|---|---|
| No. | Type | Coverage | Blister Size | Blister Color | Integrity | Oiling Off | Meltdown | Stretch | Texture | Observations |
| 9 | Mozzarella w/SHMP Alone blended in. | C | C | $C_1$ | D | F | $F_2$ | D | $C_2$ | Cheese soupy; poor yield appearance. |
| 10 | Mozzarella w/SHMP and Starch blended in. | $B_1$ | A | A | A | A | A | B | $C_2$ | Improved Yield Appearance. |

The most significant differences in grades for bake performance between the two cheeses were for meltdown and a moisture content of 52.35 wt. %, a fat content of 46.17 wt. % (dry basis), a salt content of 2.10 wt. %, and a pH of 5.35.

Sample 14 (With SHMP and Gelatin): This cheese also was prepared in essentially the same manner as Sample 6, except that 1.5 wt. % gelatin (another non-dairy protein isolate) was thoroughly mixed into the cheese, in addition to the 0.35 wt. % of SHMP. The gelatin, which was obtained from Hormel Foods, of Austin, Minn., was added as a powder. The finished cheese had a moisture content of 52.25 wt. %, a fat content of 46.6 wt. % (dry basis), a salt content of 1.6 wt. %, and a pH of 5.3.

Sample 15 (With SHMP and Guar Gum): This cheese was also prepared in essentially the same manner as that of Sample 6, except that 1.5 wt. % guar gum, in addition to 0.35 wt. % of SHMP, was thoroughly mixed into the cheese. The guar gum, obtained from T.I.C. Gums, of Belcamp, Md., was added in the form of a powder. The finished cheese had a moisture content of 52.0 wt. %, a fat content of 48.44 wt. % (dry basis), a salt content of 3.10 wt. %, and a pH of 5.26.

Method of Testing

Each of Samples 11 through 15 was evaluated as a topping on a thick-crusted pizza using the same method as in Example III. As stated above, this combination of pizza style (a relatively thick crust) and type of oven (a relatively low temperature) represents perhaps the most difficult set of conditions for achieving ideal results simultaneously in all of the different baking performance categories, i.e., blistering, oil-off, meltdown, stretch, and texture.

Evaluation of Performance

Each of the test cheeses was evaluated in the same manner as in Example III. Again, a perfect cheese would be one that scores "All" in all performance categories.

Test Results

The results of the tests are tabulated and shown in the following table (Table III):

The addition of soy protein (Sample 11 vs. Sample 13) improved every performance category except stretch, in which each test sample earned a grade of "D."

The addition of gelatin (Sample 11 vs. Sample 14) tended to improve oiling off, meltdown, stretch, and texture. Two properties were adversely affected: blister color and blister integrity.

The addition of guar gum (Sample 11 vs. Sample 15) tended to improve oiling off and meltdown, but at the expense of blister color and integrity, as well as stretch.

As can be seen by a comparison of Tables I, II, and III, even though different cheese samples are made by the same process and are tested in much the same manner, they can yield somewhat different performance grades. Samples 6, 9, and 11, for example, all contained about 0.35 wt. % SHMP, yet performed differently. This is not surprising, as mozzarella, being the product of a biological process, will vary somewhat in chemical composition—and, therefore, baking performance—from batch to batch. The age of the cheese can affect its bake performance as well. What is most significant is how the modified cheese compares in performance to the control, when both come from the same production lot and are tested on the same day.

EXAMPLE VI

Comparisons on thin-crust pizzas were made between mozzarella cheese that had SHMP alone blended into it and mozzarella cheese that had either lactalbumin or guar gum thoroughly mixed into it, along with the SHMP. The samples came from different batches.

Sample 16 (With SHMP Alone): This cheese was the same as Sample 11 in Example V. Again, the cheese had a moisture content of 53.2 wt. %, a fat content of 46.9 wt. % (dry basis), a salt content of 1.6 wt. %, and a pH of 5.33.

Sample 17 (With SHMP and Lactalbumin): This cheese was prepared in essentially the same manner as Sample 6 of Example III, except that 1.5 wt. % of lactalbumin, a dairy

TABLE III (Example V)

Performance Grades when Baked On A Thick-Crust Pizza

| Cheese Sample | | Blister Coverage | Blister Size | Blister Color | Blister Integrity | Oiling Off | Meltdown | Stretch | Texture |
|---|---|---|---|---|---|---|---|---|---|
| No. | Type | | | | | | | | |
| 11 | With SHMP Alone | D | F | $C_1$ | D | $C_2$ | $F_1$ | D | $F_1$ |
| 12 | With SHMP and Whey Protein Concentrate | A | B | $C_1$ | C | $C_1$ | A | A | A |
| 13 | With SHMP and Soy Protein | B | C | A | C | A | $B_2$ | D | $C_2$ |
| 14 | With SHMP and Gelatin | D | F | F | F | B | $B_1$ | A | A |
| 15 | With SHMP and Guar Gum | D | F | F | F | A | A | F | $F_2$ |

The foregoing test results indicate that the addition of whey protein concentrate (Sample 11 vs. Sample 12) tends to improve six of the graded qualities: blister coverage, blister size, blister integrity, meltdown, stretch, and texture. This was not at the sacrifice of blister color or oiling off, in which scores of "C's" were earned by both test samples.

solid, was added, in addition to the 0.35 wt. % of SHMP. The lactalbumin was added in powder form. The finished cheese had a moisture content of 52.3 wt. %, a fat content of 46.12 wt. % (dry basis), a salt content of 1.2 wt. %, and a pH of 5.35.

Sample 18 (With SHMP and Guar Gum): This cheese was the same as Sample 15 in Example V. Again, the cheese had a moisture content of 52.0 wt. %, a fat content of 48.44 wt. % (dry basis), a salt content of 3.10 wt. %, and a pH of 5.26.

Method of Testing

Each of Samples 16, 17, and 18 was evaluated as a topping on a pizza having a relatively thin crust. In each case a 12-inch diameter pizza was baked on a screen in a Blodgett deck oven at 500° F. for 9 minutes. The crust, weighing 12 oz., had not been previously par-baked. Each pizza had 4 oz. of tomato-base pizza sauce spread on the crust, and 8 oz. of the test cheese sprinkled on top of the sauce. Nine minutes was the required length of time for the crust to be correctly baked.

Evaluation of Performance

Each of the test cheeses was evaluated in the same manner as in Example III, using the same grading chart. Again, a perfect cheese would be one that scores "A" in all performance categories.

Test Results

The results of the tests are tabulated and shown in the following table (Table IV):

TABLE IV (Example VI)

| Cheese Sample | | Performance Grades when Baked On A Thin-Crust Pizza | | | | | | |
|---|---|---|---|---|---|---|---|---|
| No. | Type | Blister Coverage | Blister Size | Blister Color | Blister Integrity | Oiling Off | Meltdown | Stretch | Texture |
| 16 | With SHMP Alone | C | C | $C_1$ | D | F | $F_2$ | D | $C_2$ |
| 17 | With SHMP and Lactalbumin | D | D | F | F | B | A | D | A |
| 18 | With SHMP and Guar Gum | F | F | $C_1$ | F | B | A | A | $C_2$ |

The foregoing test results indicate that the addition of lactalbumin (Sample 17 vs. Sample 16) tends to improve oiling off, meltdown, and texture when the cheese is baked on a thin-crust pizza, but at the slight expense of blistering qualities.

The addition of the guar gum (Sample 18 vs. Sample 16) also appeared to improve oiling off, meltdown, and stretch in the thin-crust environment, but appeared to adversely affect blister coverage, size, and integrity.

Although the control cheese in this example (Sample 16) did not receive acceptable grades in oiling off or meltdown, that is not to say that all SHMP-modified mozzarellas prepared by the process used to produce Sample 16 would perform as poorly when baked at 500° F. for 9 minutes on a thin-crust pizza. Many would not. It is submitted, however, that these three samples (Nos. 16, 17, and 18) provide an indication of how, in general, the process of the present invention can be used to alter one or more of the properties that the cheese exhibits when baked on a pizza.

Cheese produced by the process of the present invention will generally retain its baking properties regardless of whether it is frozen after it is removed from the brine tank. If desired, the cheese can be kept in an unfrozen state and packaged in air-tight packages that have been flushed with nitrogen and/or carbon dioxide to prevent spoiling.

We claim:

1. In a process of manufacturing a soft or semi-soft fibrous cheese comprising the following steps:
   a) pasteurizing cow's or buffalo milk;
   b) acidifying the milk to convert it to a cheese milk;
   c) coagulating the cheese milk to obtain a coagulum comprised of curd and whey;
   d) cutting the coagulum and draining the whey therefrom, thereby leaving a cheese curd;
   e) heating, kneading, and stretching the cheese curd until it is a homogeneous, fibrous mass of heated, unripened cheese;
   f) forming the heated cheese into a shape;
   g) cooling the shaped cheese in cold brine; and
   h) removing the cooled cheese from the brine;
   the improvement wherein, between said steps (e) and (f), there is thoroughly mixed into the heated cheese a minor amount of at least one food additive selected from the group consisting of gums, stabilizers, colorants, dairy solids, cheese powders, flavors, non-dairy protein isolates, and native or modified food starches.

2. The process of claim 1 wherein the cheese is maintained at a temperature of no more than about 160° F. while the food additive is mixed in.

3. The process of claim 1 in which an emulsifying agent, is also mixed into the heated cheese between steps (e) and (f), in an amount of about 0.01 to 2 percent, based on the weight of the cheese.

4. The process of claim 3 wherein the emulsifying agent is an emulsifying salt.

5. The process of claim 3 wherein the emulsifying agent is a phosphate or citrate salt.

6. The process of claim 5 wherein the emulsifying agent is a sodium salt.

7. The process of claim 3 wherein the emulsifying agent is mixed into the cheese in the form of an aqueous solution containing about 5 to 50 percent of the emulsifier, based on the weight of the solution.

8. The process of claim 3 wherein the emulsifying agent is selected from the group consisting of sodium hexametaphosphate, monosodium phosphate, disodium phosphate, sodium tripolyphosphate, and sodium citrate, which is mixed into the heated cheese in the form of an aqueous solution containing about 5 to 50 weight percent solids.

9. The process of claim 3 wherein the emulsifying agent is mixed into the cheese in an amount of about 0.5 to 2 percent, based on the weight of the cheese.

10. The process of claim 1 wherein the cheese is maintained at a temperature in the range of about 110 to 145° F. while the food additive is mixed in.

11. The process of claim 1 wherein, after step (h), the cheese has a moisture content in the range of about 45 to 60 weight percent and a milkfat content of at least about 30 weight percent, on a dried solids basis.

12. The process of claim 1 wherein the temperature of the cheese is maintained in the range of about 110 to 160° F. while the food additive is mixed into the cheese.

13. The process of claim 1 wherein the food additive is mixed into the heated cheese for a period of time ranging from about 2 to 10 minutes, before the cheese is formed into a shape.

14. The process of claim 1 wherein, in step (f), the heated cheese is formed into a shape by being extruded into cold sodium chloride brine and, in step (g), the cheese extrudate is held in cold sodium chloride brine until its core temperature drops to about 75° F. or below, and wherein the cooled extrudate is subsequently cut into segments.

15. The process of claim 1 wherein, in step (a), cow's milk is used.

16. The process of claim 1 wherein, in step (f), the heated cheese is formed into a shape by being extruded as a continuous ribbon into cold sodium chloride brine and, in step (g), the cheese ribbon is held in cold sodium chloride brine until its core temperature drops to about 75° F. or below, and wherein the cooled ribbon is subsequently cut into sections, the sections of cooled cheese are comminuted, and the comminuted cheese is then individually quick frozen.

17. The process claim 1 wherein, in step (f), the heated cheese is formed into a string shape by being extruded into cold sodium chloride brine and, in step (g), the string-shaped extrudate is held in cold sodium chloride brine until its core temperature drops to about 75° F. or below, and wherein the cooled string-shaped extrudate is subsequently cut into segments.

18. The process of claim 1 in which a food starch, alone or in combination with one or more other food additives, is mixed in dry form into the heated cheese between steps (e) and (f).

19. The process of claim 18 wherein the food starch is mixed into the heated cheese in an amount of about 0.5 to 10 percent, based on the weight of the cheese.

20. The process of claim 18 wherein the food starch is mixed into the heated cheese in an amount of about 1 to 4 percent, based on the weight of the cheese.

21. The process of claim 20, in which the starch is selected from the group consisting of potato starch, pea starch, tapioca, corn starch, wheat starch, and rice starch.

22. The process of claim 21, wherein the starch is modified.

23. The process of claim 22, wherein the starch is not pre-gelatinized.

24. The process of claim 1 in which a dairy solid, alone or in combination with one or more other food additives, is mixed into the heated cheese between steps (e) and (f), in an amount of about 0.1 to 10 percent, based on the weight of the cheese.

25. The process of claim 24 wherein the dairy solid is nonfat dry milk.

26. The process of claim 25 wherein the nonfat dry milk is mixed into the cheese in dry form.

27. The process of claim 24 wherein the dairy solid is whey protein concentrate.

28. The process of claim 27 wherein the whey protein concentrate is mixed into the cheese in dry form.

29. The process of claim 24 wherein the dairy solid is lactalbumin.

30. The process of claim 29 wherein the lactalbumin is mixed into the cheese in dry form.

31. The process of claim 1 in which salt is also mixed into the heated cheese between steps (e) and (f), in an amount of about 0.1 to 5 percent, based on the weight of the cheese.

32. The process of claim 31 wherein the salt is mixed into the cheese in granular form.

33. The process of claim 1 in which one or more gums, alone or in combination with one or more other food additives, is mixed into the heated cheese between steps (e) and (f), in an amount of about 0.1 to 10 percent, based on the weight of the cheese.

34. The process of claim 33 wherein the total amount of gum used is about 1 to 4 percent.

35. The process of claim 1 in which one or more gums selected from the group consisting of xanthan gum, guar gum, and locust bean gum, alone or in combination with one or more other food additives, is mixed into the heated cheese between steps (e) and (f) in an amount of about 0.1 to 10%, based on the weight of the cheese.

36. The process of claim 35, wherein the total amount of gum used is about 1 to 4% and the gum is mixed into the cheese in dry form.

37. The process of claim 1 in which one or more colorants, alone or in combination with one or more other food additives, is mixed into the heated cheese between steps (e) and (f), in amount of about 0.1 to 2 percent, based on the weight of the cheese.

38. The process of claim 37 wherein both anatto and tumeric are mixed into the heated cheese, in an anatto-to-tumeric weight ratio within the range of about 1/1 to about 75/1.

39. The process of claim 38 wherein the amount of anatto used is approximately 0.1 to 0.3 percent and the anatto and tumeric are added in the form of a solution or dispersion in water.

40. The process of claim 1 in which one or more cheese powders, alone or in admixture with one or more other food additives, is mixed into the heated cheese between steps (e) and (f), in an amount of about 0.25 to 10%, based on the weight of the cheese.

41. The process of claim 40 wherein the total amount of cheese powder used is about 0.25 to 1%.

42. The process of claim 41 wherein the cheese powder is selected from the group consisting of parmesan, cheddar, Monterey Jack, Romano, muenster, Swiss, and provolone and is mixed into the cheese in dry form.

43. The process of claim 1 in which one or more flavors, alone or in admixture with one or more other food additives, is mixed into the heated cheese between steps (e) and (f), in an amount of about 0.01 to 5%, based on the weight of the cheese.

44. The process of claim 43 wherein the flavor is selected from the group consisting of cheddar cheese flavor and parmesan cheese flavor and is mixed into the cheese in the form of an aqueous solution containing about 5 to 50 weight percent of the flavor.

45. The process of claim 1 in which one or more non-dairy protein isolates, alone or in combination with one or more other food additives, is mixed into the heated cheese between steps (e) and (f), in an amount of about 0.1 to 10%, based on the weight of the cheese.

46. The process of claim 1 in which one or more non-dairy protein isolates selected from the group consisting of soy protein, gelatin, wheat germ, corn germ, gluten, and egg solids, alone or in combination with one or more other food additives, is mixed into the heated cheese between steps (e) and (f), in an amount of about 0.1 to 10%, based on the weight of the cheese.

47. The process of claim 46 wherein the non-dairy protein isolate is mixed into the heated cheese in the form of a powdered solid.

48. The process of claim 1 in which one or more stabilizers, alone or in combination with one or more other food additives, is mixed into the heated cheese between steps (e) and (f), in an amount of about 0.1 to 10%, based on the weight of the cheese.

49. The process of claim 1 in which one or more stabilizers selected from the group consisting of chondrus extract, pectin, gelatin, and agar, alone or in combination with one or more other food additives, is mixed into the heated cheese between steps (e) and (f), in an amount of about 0.1 to 10%, based on the weight of the cheese.

50. The process of claim 49, wherein the total amount of stabilizer used is about 1 to 4% and the stabilizer is mixed into the cheese in dry form.

* * * * *

UNITED STATES PATENT AND TRADEMARK OFFICE
CERTIFICATE OF CORRECTION

PATENT NO. : 5,902,625

DATED : May 11, 1999

INVENTOR(S): RICHARD LEE BARZ, ET AL.

It is certified that error appears in the above-identified patent and that said Letters Patent is hereby corrected as shown below:

<u>COLUMN 2</u>
    Line 65, "is," should read --is--.

<u>COLUMN 4</u>
    Line 38, "of the present" (second occurrence) should be deleted.

<u>COLUMN 19</u>
    Line 33, "All" should read --"A"--.

Signed and Sealed this

Twenty-ninth Day of May, 2001

Attest:

NICHOLAS P. GODICI

*Attesting Officer*     *Acting Director of the United States Patent and Trademark Office*